United States Patent
Ohara

(10) Patent No.: US 7,458,914 B2
(45) Date of Patent: Dec. 2, 2008

(54) METHOD AND APPARATUS FOR A LOW COST AND HIGH FORCE TRANSMISSION USING ELASTICALLY DEFORMABLE DRIVING ELEMENT FOR FRICTION DRIVE

(75) Inventor: Tetsuo Ohara, Sutton, MA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1272 days.

(21) Appl. No.: 10/109,723

(22) Filed: Mar. 29, 2002

(65) Prior Publication Data
US 2003/0186777 A1 Oct. 2, 2003

(51) Int. Cl.
*F16H 13/00* (2006.01)
(52) U.S. Cl. .......................... 476/67; 476/72
(58) Field of Classification Search ............ 476/67, 476/72
See application file for complete search history.

(56) References Cited

U.S. PATENT DOCUMENTS

| | | | | |
|---|---|---|---|---|
| 3,949,618 A * | 4/1976 | Raschle | ............. | 476/72 |
| 4,183,254 A * | 1/1980 | Good | ............. | 476/31 |
| 4,378,709 A * | 4/1983 | Chitayat | ............. | 74/89 |
| 4,518,460 A | 5/1985 | Hauser et al. | | |
| 4,763,171 A * | 8/1988 | Schell | ............. | 355/50 |
| 5,227,708 A | 7/1993 | Lowrance | | |
| 5,420,664 A | 5/1995 | Miwa et al. | | |
| 2002/0022546 A1* | 2/2002 | Okoshi | ............. | 476/65 |
| 2002/0147068 A1* | 10/2002 | Chikaraishi et al. | ............. | 476/21 |

FOREIGN PATENT DOCUMENTS

| | | |
|---|---|---|
| EP | 0 423 608 A1 | 4/1991 |
| JP | 03-136779 A | 6/1991 |
| JP | 04-000047 A | 1/1992 |
| JP | 06-264970 A | 9/1994 |
| JP | 08-111990 A | 4/1996 |
| JP | 11-118013 A | 4/1999 |
| JP | 2002-039309 A | 2/2002 |

OTHER PUBLICATIONS

A. H. Slocum; "Precision Machine Design"; Prentice Hall, pp. 341, 416, and 700-705; 1992.
S. Sakuta et al.; Ultra-Precision Positioning By Friction Drive-Table Control for DVD Mastering Japan/USA Symposium on Flexible Automation, vol. 1, ASME 1996.
Shigeru Sakuta et al., Ultra-Precision Positioning By Friction Drive—Table Control for DVD Mastering Machine-, Jap/USA Symposium on Flexible Automation, vol. 1, ASME 1996; Abstract Only.
Japanese Official Action for corresponding Japanese Application No. JP 2003-008894 mailed Aug. 12, 2008.

* cited by examiner

*Primary Examiner*—David M Fenstermacher
(74) *Attorney, Agent, or Firm*—RatnerPrestia

(57) ABSTRACT

An elastically deformable transmission member for use in a friction drive system. The elastically deformable transmission member imparts a thrust to a moveable member at an area of contact between the elastically deformable transmission member and the moveable member. Elastic deformation of the elastically deformable transmission member, such as by application of a pre-load force perpendicular to the direction of motion of the moveable member, causes an increase in contact area between the elastically deformable transmission member and the moveable member. The increased contact area reduces stress in the elastically deformable transmission member and the moveable member, reducing wear.

16 Claims, 5 Drawing Sheets

METHOD AND APPARATUS FOR A LOW COST AND HIGH FORCE TRANSMISSION USING ELASTICALLY DEFORMABLE DRIVING ELEMENT FOR FRICTION DRIVE

TECHNICAL FIELD

This invention relates to generally to a precision motion system, and more particularly to a method and apparatus for providing at a low cost, high force transmission using a friction drive with an elastically deformable driving element.

BACKGROUND OF THE INVENTION

Precision motion systems with resolutions in down to ten nanometers are required in many manufacturing applications, including assembly and alignment of optical transmission and processing equipment. Traditionally, precision motion is provided by a combination of a DC or AC servo motor, a high precision feedback encoder, and a high precision linear bearing. A 6-axis motion control stage incorporating these sub-systems, however, can be expensive. These sub-systems are also complicated, which can cause reliability problems.

One alternative to these complicated precision systems is a motion system using a friction drive. Typically a friction drive comprises a drive shaft which is rotated by a power source, such as a motor, and a stage which moves in a linear direction, due to the frictional force (thrust) applied to it by the rotation of the shaft. Friction drives, however, often suffer from excessive wear of the drive shaft. This is because friction drives require a substantial pre-load force to achieve the necessary thrust for most motion applications without the friction drive slipping.

To overcoming this wear problem, low wear materials, such as ceramics may be used for the drive shaft. Low-wear materials, however, are expensive to use and are often difficult to produce in the necessary configurations. Low-wear materials may also adversely affect the frictional coefficient of the drive shaft.

Accordingly, a need exists for a friction drive that provides a high thrust, sufficient to move a variety of manufacturing equipment, without causing excessive wear of the drive shaft.

SUMMARY OF THE INVENTION

The present invention provides an elastically deformable transmission member for use in a friction drive system. In an exemplary embodiment, the elastically deformable transmission member is in frictional contact with a moveable member, imparting a thrust to the moveable member at an area of contact between the elastically deformable transmission member and the moveable member. Elastic deformation of the elastically deformable transmission member, such as by application of a pre-load force perpendicular to the direction of motion of the moveable member, causes an increase in contact area between the elastically deformable transmission member and the moveable member. The increased contact area reduces stress in the elastically deformable transmission member and the moveable member, reducing wear.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Figure 1:
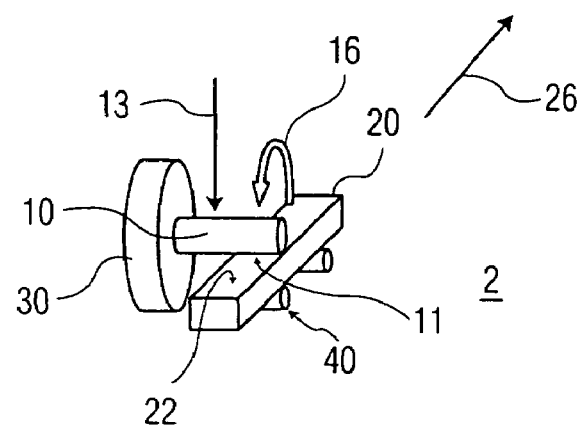
FIG. 1 is a prior art friction drive.

Referring now to the drawing, in which like reference numbers refer to like elements throughout, FIG. 1 shows a prior art friction drive 2. A motor 30 provides a rotational force to a shaft 10, causing shaft 10 to rotate about its axis in a direction of rotation 16. A moveable member 20 has a surface 22, a portion of which is in contact with a contact area 11 of shaft 10. A pre-load force 13 is applied to shaft 10 urging shaft 10 toward surface 22 with a contact force proportional to pre-load force 13. Shaft 10 acts as a transmission member generating a frictional force (not shown) on surface 22 by the rotation of shaft 10. The frictional force acts as a thrust, moving moveable member 20 in a direction of motion 26 (i.e., first direction). In the first order approximation, the frictional force (or thrust) is proportional to pre-load force 13. Backup rollers 40 are biased toward moveable member 20 opposite the pre-load force to maintain a uniform contact pressure between shaft 10 and moveable member 20.

When used in a precision positioning device, the prior art friction drive described above has a problem. In order to provide precise motion to moveable member 20, the shaft diameter is ideally minimized. This is because an angular error in the motor translates to a smaller positional error in the moveable member. In a precision positioning device, however, the moveable member may have a substantial mass such as fixtures, work pieces, equipment, and the like, requiring a high pre-load force to generate adequate thrust. The combination of a small diameter for shaft 10 and a high pre-load force results in excessive wear of the shaft, the moveable member, or both.

Figure 2:
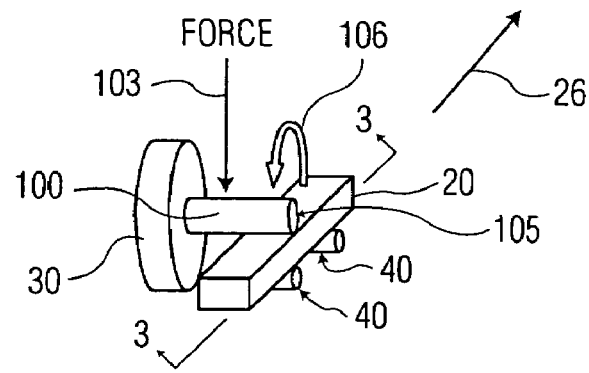
FIG. 2 is a friction drive with a deformable transmission member according to an exemplary embodiment of the present invention.
Figure 3:
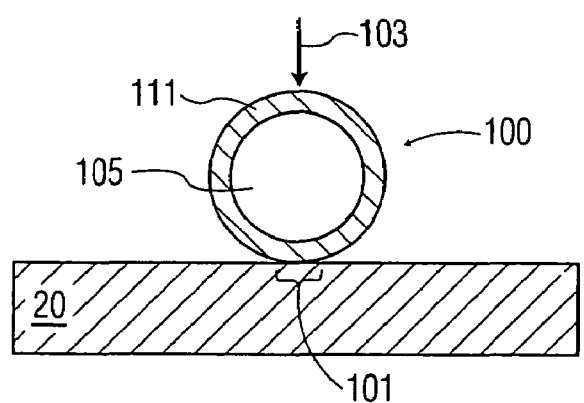
FIG. 3 is a sectional view of the friction drive of FIG. 2 taken along axis 3-3 in FIG. 2.

The present invention overcomes this and other problems associated with friction drives by providing an elastically deformable transmission member 100, as shown in FIGS. 2 and 3. Elastically deformable transmission member 100 may be integral with a drive shaft as shown in FIG. 2. In an exemplary embodiment, elastically deformable transmission member 100 may be incorporated into prior art friction drive 2, shown in FIG. 1. Elastically deformable transmission member 100, however, is not limited to the friction drive illustrated in FIG. 1 and described above, but may be incorporated into alternative friction drives, as will be understood by those of skill in the art.

In the exemplary embodiment of FIGS. 2 and 3, elastically deformable transmission member 100 is rotated in a direction of rotation 106 by impulses from rotary ultrasonic motor 30. It should be understood that rotational force may be provided by means other than a rotary ultrasonic motor, such as a rotary pneumatic actuator, a rotary hydraulic actuator, lead screws, and the like. A rotary ultrasonic motor, however, provides a highly reliable angular displacement, particularly rotary ultrasonic motor model number USR30 from Shinsei Corp. of Tokyo, Japan, when driven by driver model number D6030 also from Shinsei Corp.

A pre-load force 103 is applied to elastically deformable transmission member 100, urging it toward a surface 22 of moveable member 20. Back-up rollers 40 urge moveable member 20 toward elastically deformable transmission member 100 to maintain a uniform contact force between elastically deformable transmission member 100 and surface 22 of moveable member 20 notwithstanding minor non-linearity in the motion of moveable member 20. The rotation of elastically deformable transmission member 100 and the contact force generate a frictional force on surface 22 of moveable member 20. The frictional force acts as a thrust, moving moveable member 20 in a direction of motion 26. Direction of motion 26 is essentially perpendicular to the direction of pre-load force 103.

Elastically deformable transmission member 100 contacts surface 22 of moveable member 20 at contact area 101 (shown in FIG. 3). Elastically deformable transmission member 100 deforms elastically under the contact force created by pre-load force 103. This elastic deformation increases contact area 101 as compared to a contact area for a non-deformable transmission member having the same diameter as elastically deformable transmission member 100. Because the contact force is the same as the contact force for a non-deformable transmission member, the thrust is essentially the same. The wear caused by frictional contact between elastically deformable transmission member 100 and surface 22 of moveable member 20, however is reduced because the contact force is distributed over an increased contact area.

The diameter of elastically deformable transmission member 100 is minimized to maintain positional resolution. The positional resolution is reduced by angular uncertainty in rotary ultrasonic motor 30. Accordingly, as the diameter decreases, the angular uncertainty translates to a smaller positional uncertainty and resolution improves. In an exemplary embodiment of the invention, the diameter is less than about 5.25 mm and achieves a step resolution of less than 10 nm. Decreasing the diameter of elastically deformable transmission member 100 also increases the thrust force, and increasing the diameter of elastically deformable transmission member 100 increases the speed of moveable member 20.

Elastically deformable transmission member 100 comprises a material having sufficient strength for the torsional load and pre-load necessary to achieve the desired thrust. The material also desirably has a sufficient elasticity to allow it to elastically deform under the contact force applied to achieve the desired thrust. In an exemplary embodiment, elastically deformable transmission member 100 comprises a heat treated stainless steel.

In an exemplary embodiment, elastically deformable transmission member 100 comprises a cylindrical wall or ring 111. The thickness of cylindrical wall 111 is sized to provide elastic deformation at the contact pressure necessary to achieve the desired thrust and the diameter necessary to achieve the desired positional resolution. This elastic deformation causes elastically deformable transmission member 100 to decrease in radius in the direction of pre-load force 103 and to increase in radius perpendicular to pre-load force 103 (i.e., in direction of motion 26). The increased radius in direction of motion 26 causes an increased radius of curvature at contact area 101 increasing contact area 101. The cylindrical ring may be integral with the shaft of rotary ultrasonic motor 30 and may be defined, for example, by the cylindrical surface forming the outside diameter of the shaft of rotary ultrasonic motor 30 and an aperture 105 essentially concentric with the outside diameter. Aperture 105 may be formed by turning, milling, or other fabrication processes capable of providing an essentially concentric aperture in a shaft. In an exemplary of elastically deformable transmission member 100, having an outside diameter of about 5.25 mm, the aperture may have a diameter of between about 4 mm and 4.6 mm. The resulting cylindrical wall, having a thickness of between about 0.325 mm and 0.625 mm and comprising a heat treated stainless steel material deforms to increase contact area 101 between elastically deformable transmission member 100 and moveable member 20.

The deformation of elastically deformable transmission member 100, and the resulting increase in contact area 101 reduces the contact stress (the stress caused by the force applied at the contact area due to pre-load force 103). In an exemplary embodiment, this contact stress is reduced to a stress that is below the yield stress, at which the elastically deformable transmission member 100, the moveable member 20, or both suffer wear. This wear is caused by damage of the surface of cylindrical wall 111 or surface 22 when the contact stress exceeds the yield stress of the material of cylindrical wall 111 or moveable member 20.

Deformation of elastically deformable transmission member 100 increases the stiffness of elastically deformable transmission member 100 in direction of motion 26. This is because stiffness increases with increased radius and the radius of cylindrical wall 111 is increased in direction of motion 26. This increased stiffness in direction of motion 26 improves positional accuracy of the friction drive system by reducing dead zones and backlash.

Figure 4A:
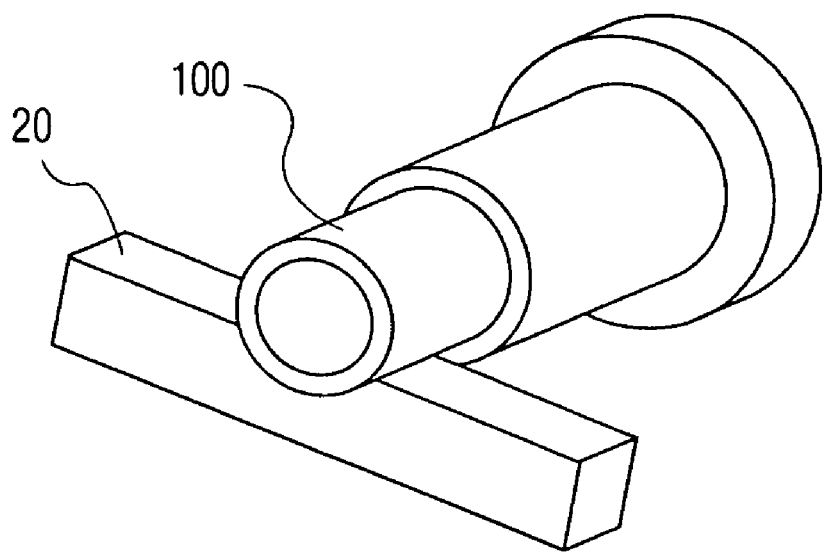
FIGS. 4A is an illustration of a finite element analysis of the friction drive of FIG. 2 showing meshed structure before force application.
Figure 4B:
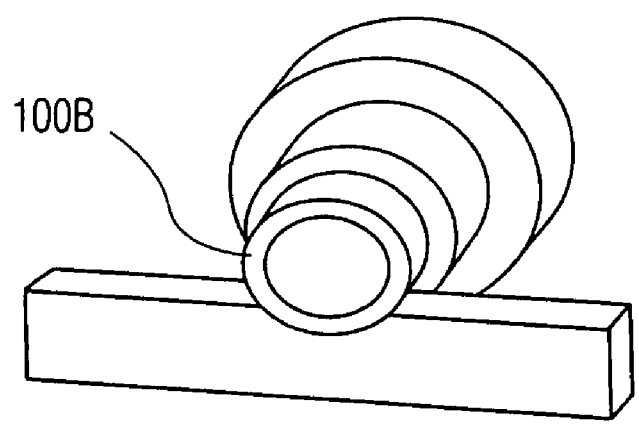
FIG. 4B is an illustration of a finite element analysis of the friction drive of FIG. 2 showing deformation.

A finite element model (FEM) was analyzed for elastically deformable transmission member 100, as shown in FIGS. 4A and 4B. For modeling purposes, elastically deformable transmission member 100 was given the dimensions provided above for an exemplary embodiment of a linear stage. A range of 190 to 210 gigapascal (Gpa) was used for Young's modulus. The applied pre-load force used in the analysis ranged from 10 lbf to 30 lbf. As shown in FIG. 4B, following application of the pre-load force, elastic deformation took place in a model elastically deformable transmission member 100B, increasing its contact area with moveable member 20.

Figure 5:
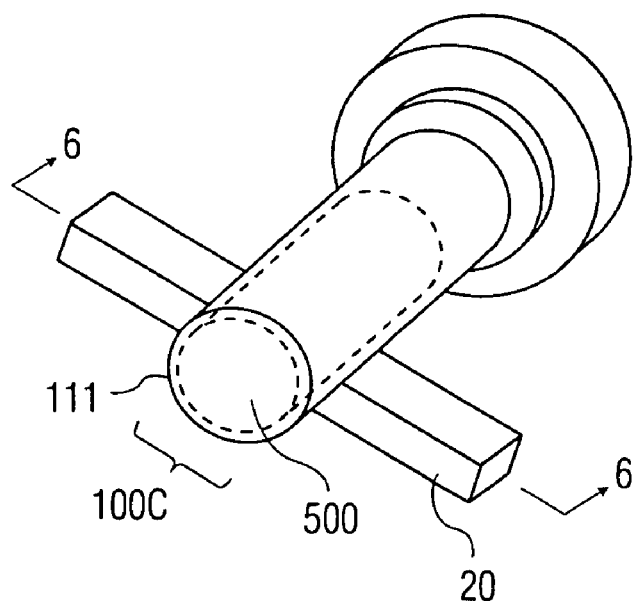
FIGS. 5 and 5A are an elastically deformable transmission member for a friction drive incorporating a viscoelastic damping material according to an exemplary embodiment of the present invention.
Figure 6:
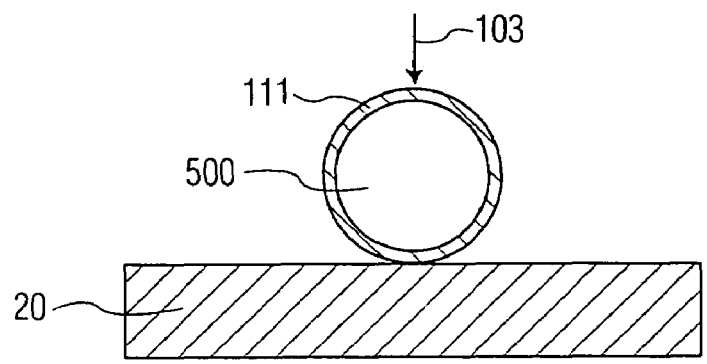
FIGS. 6 and 6A are sectional views of the elastically deformable transmission members of FIG. 5 and 5A taken along axis 6-6 and 6A-6A, respectively.

In an exemplary embodiment, shown in FIGS. 5 and 6, the space provided by aperture 105 is used to provide damping to an elastically deformable transmission member 100C. Specifically, in the exemplary embodiment shown in FIG. 5, a viscoelastic material 500 is disposed in aperture 105. Viscoelastic material 500 may fill aperture 105 as shown in FIGS.

Figure 5A:
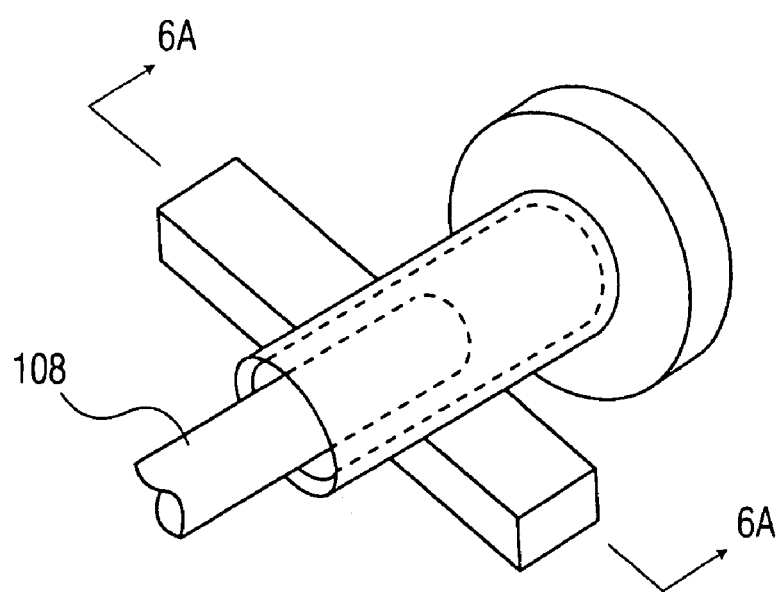
Figure 6A:
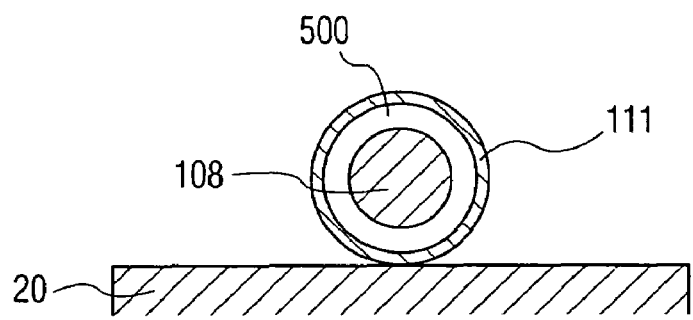

5 and 6. Alternatively, an inner shaft 108 may be disposed in aperture 105 with viscoelastic material 500 filling the gap between cylindrical wall 111 and inner shaft 108. Inner shaft 108 may extend beyond cylindrical wall 111 as shown in FIGS. 5A and 6A, and be retained by a radial bearing (not shown). Alternatively, inner shaft 108 may be integral with elastically deformable transmission member 100. Viscoelastic material 500 may be any of a variety of materials known in the art to provide damping by absorbing energy while deforming in response to an applied force. Viscoelastic material 500 may be attached to elastically deformable transmission member 100 at the inside diameter of cylindrical wall 111 or at the bottom of aperture 105, or both. When moveable member 20 is under vibration in a friction drive system, viscoelastic material 500 dampens the vibrations (absorbs the vibration energy), enhancing positional resolution of the friction drive system.

Figure 7:
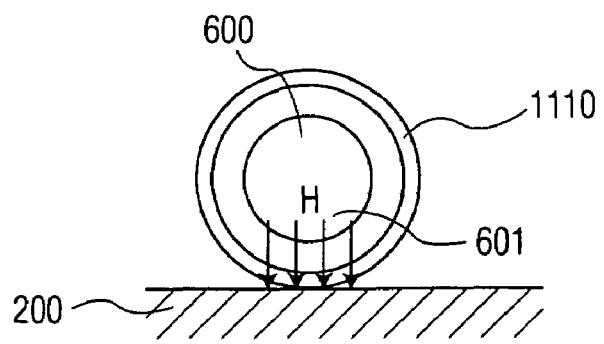
FIG. 7 is a sectional view of an elastically deformable transmission member for a friction drive incorporating magnetic damping according to an exemplary embodiment of the present invention.

Referring now to FIG. 7, an exemplary embodiment is shown that uses a magnetic field 601 to provide damping to the electrically deformable transmission member. Magnetic field 601 is created by a magnet 600 disposed within aperture 105 of elastically deformable transmission member 100D. Both elastically deformable transmission member 100D and moveable member 20D comprise conductive material. When elastically deformable transmission member 100D moves relative magnet 600 eddy currents are generated that dampen friction drive vibrations by dissipating the vibration energy as heat through elastically deformable transmission member 100D and moveable member 20.

Figure 8A:
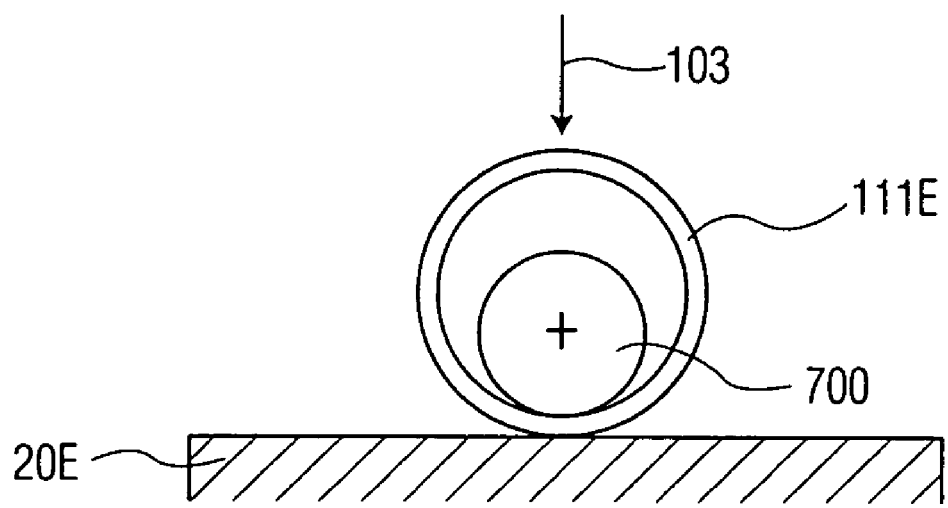
FIGS. 8A is a sectional view of an elastically deformable transmission ring driven by an inner shaft of a friction drive with a pre-load force applied, according to an exemplary embodiment of the present invention.
Figure 8B:
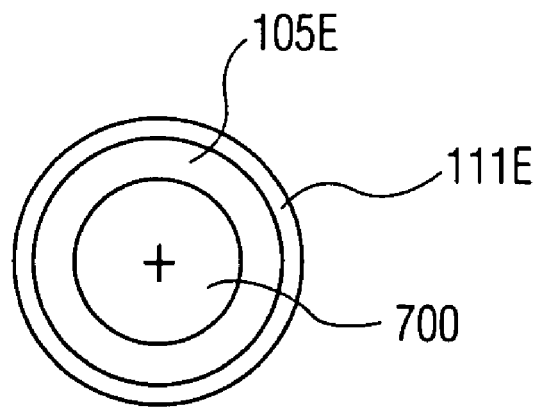
FIG. 8B is a sectional view of the elastically deformable transmission ring of FIG. 8A without a pre-load force applied.

Another exemplary embodiment of the invention is shown in FIGS. 8A and 8B. An inner shaft 700 is disposed within cylindrical wall 111E. In this exemplary embodiment, inner shaft 700 is urged toward moveable member 20 by a pre-load force (e.g., pre-load force 103). When pre-load force 103 is applied, as shown in FIG. 8A cylindrical wall 111E is elastically deformed as it is pressed between inner shaft 700 and moveable member 20. This elastic deformation increases the contact area between cylindrical wall 111E and moveable member 20. Cylindrical wall 111E is configured such that it is not in contact with inner shaft 700 at contact area 101E when no pre-load force is applied, as shown in FIG. 8B.

Friction drives, including the exemplary embodiments illustrated and described herein, may be used in a variety of applications for transferring motion accurately from a rotary power source to a rotary or linear moveable member. One advantageous application of a friction drive system requiring positional accuracy is a linear stage, such as for use in optics fabrication. Positional accuracy of the linear stage is critical to maintain optical alignment. The linear stage, however may be required to support a substantial tooling weight, requiring a large thrust force. The present invention as illustrated and described herein, provides adequate thrust force for a linear stage used in fiber optic fabrication, while maintaining positional resolution of less than 10 nm.

Although illustrated and described above with reference to certain specific embodiments, the present invention is nevertheless not intended to be limited to the details shown. Rather, various modifications may be made in the details within the scope and range of equivalents of the claims and without departing from the invention.

What is claimed:

1. A friction drive system comprising a transmission member and a movable member, wherein the transmission member imparts a thrust to the moveable member through frictional contact with the movable member at a contact area and the transmission member elastically deforms to reduce contact stress to a stress that is below yield stress and to increase the contact area between the transmission member and the movable member;

wherein the elastically deformable transmission member comprises an elastically deformable drive ring defined by a cylindrical surface in frictional contact with the movable member and an aperture essentially concentric to the cylindrical surface.

2. The friction drive system of claim 1 further comprising a motor with a motor shaft, wherein the elastically deformable drive ring is integral to the motor shaft.

3. The friction drive system of claim 1 further comprising a motor with a motor shaft, wherein the elastically deformable drive ring is attached to the motor shaft.

4. A shaft for use in a friction drive system comprising:

a contact portion for transferring a thrust to a moveable member through frictional contact with the movable member under a pre-load force; the contact portion configured as a cylindrical wall having a thickness such that the cylindrical wall elastically deforms under the pre-load force to increase the contact area, wherein a viscoelastic material is disposed within the cylindrical wall for damping vibrations in the shaft.

5. A shaft for use in a friction drive system comprising:

a contact portion for transferring a thrust to a movable member through frictional contact with the movable member under a pre-load force; the contact portion configured as a cylindrical wall having a thickness such that the cylindrical wall elastically deforms under the pre-load force to increase the contact area, wherein a magnet disposed within the cylindrical wall and wherein the cylindrical wall comprises an electrically conductive material such that movement of the cylindrical wall produces eddy currents for damping vibrations in the shaft.

6. A friction drive system comprising:

a movable member moveable in a first direction;

a shaft having an essentially cylindrical surface urged into contact with the movable member by a pre-load force such that rotation of the shaft imparts a thrust to the movable member along the first direction through frictional contact; the shaft having an aperture essentially concentric with the cylindrical surface defining a cylindrical wall that elastically deforms under the pre-load force.

7. The friction drive system of claim 6 wherein the cylindrical wall is exposed to a contract stress and the cylindrical wall comprises a material having a yield stress such that the contact stress on the cylindrical wall is less than the yield stress of the cylindrical wall.

8. The friction drive system of claim 6 wherein the elastic deformation of the cylindrical wall increases the shaft stiffness in the first direction to reduce dead zones and backlash.

9. The friction drive system of claim 6 further comprising a motor for rotating the shaft.

10. The friction drive system of claim 9 wherein the motor is an ultrasonic motor.

11. The friction drive system of claim 6 wherein the movable member is a linear stage for optics fabrication.

12. The friction drive system of claim 6 further comprising a magnet disposed within the cylindrical wall and wherein the cylindrical wall and the moveable member comprise electrically conductive materials such that movement of the cylindrical wall produces eddy currents for damping vibrations in the friction drive system.

13. The friction drive system of claim 6 further comprising an inner shaft portion disposed within the cylindrical wall; wherein the inner shaft portion applies the pre-load force to the cylindrical wall.

14. The friction drive system of claim 6 wherein a positional resolution of less than 10 nm is provided.

15. A friction drive system comprising:
a movable member moveable in a first direction;
a shaft having an essentially cylindrical surface urged into contact with the movable member by a pre-load force such that rotation of the shaft imparts a thrust to the movable member along the first direction through frictional contact; the shaft having an aperture essentially concentric with the cylindrical surface defining a cylindrical wall that elastically deforms under the pre-load force, wherein a viscoelastic material is disposed in the aperture for damping vibrations in the friction drive system.

16. The friction drive system of claim 15 wherein the viscoelastic material further comprising an inner shaft is disposed between the inner shaft and the cylindrical wall and provides damping of vibrations in the friction drive system.

* * * * *